United States Patent [19]
Lyman

[11] Patent Number: 5,777,957
[45] Date of Patent: Jul. 7, 1998

[54] MULTIPLE COMPACT DISK CAROUSEL MECHANISM

[75] Inventor: Roy Patrick Lyman, North Syrcause, N.Y.

[73] Assignee: Thomson Consumer Electronics, Inc., Indianapolis, Ind.

[21] Appl. No.: 974,147

[22] Filed: Nov. 19, 1997

Related U.S. Application Data

[63] Continuation of Ser. No. 560,756, Nov. 21, 1995, abandoned.

[51] Int. Cl.[6] ............................................. G11B 17/22
[52] U.S. Cl. ................................... 369/37; 369/75.2
[58] Field of Search ........................ 369/37, 75.2, 178, 369/191–192, 36

[56] References Cited

U.S. PATENT DOCUMENTS

| | | |
|---|---|---|
| 4,755,978 | 7/1988 | Takizawa et al. ............................ 369/37 |
| 5,191,569 | 3/1993 | Kurosawa et al. ......................... 369/75.2 |
| 5,197,056 | 3/1993 | Van Heusden et al. ................... 369/191 |
| 5,218,593 | 6/1993 | Kaneo et al. ............................. 369/75.2 |
| 5,386,403 | 1/1995 | Morioka et al. ............................. 369/37 |

Primary Examiner—Stuart S. Levy
Assistant Examiner—Brian E. Miller
Attorney, Agent, or Firm—Joseph S. Tripoli; Peter M. Emanuel; Kuniyuki Akiyama

[57] ABSTRACT

A multiple compact disk (CD) carousel mechanism for a CD player has a novel loading drawer mechanism employing the combination of a pin arm and a uniquely configured drawer guide slot (within which a pin attached to the end of the pin arm travels) attached to the underside of the drawer for carrying out the following operations: drawer opening; drawer locking in the opened position; drawer closing; and drawer locking in the closed position. The improved design obviates the need for prior art rack and pinion gears for drawer movement, and also obviates the need for separate prior art drawer lock-in and drawer lock-out mechanisms (requiring additional springs, levers and gears).

5 Claims, 3 Drawing Sheets

MULTIPLE COMPACT DISK CAROUSEL MECHANISM

This is a continuation of application Ser. No. 08/560,756, filed Nov. 21, 1995 now abandoned.

FIELD OF THE INVENTION

The present invention generally relates to compact disk players. More particularly, the present invention relates to carousel mechanisms which allow a user to load and unload several compact disks to be played by a compact disk player.

BACKGROUND OF THE INVENTION

Compact disks (CDs) are well known data storage devices which often contain digitally encoded audio and/or video information signals retrievable by special readers, generically referred to as CD players. Many CD players available in recent years—especially those of the audio variety—contain carousel mechanisms for allowing a user to load and unload several disks while a disk is being played.

These carousels generally contain a loading drawer which carries a rotating platter. Several CDs (5 in some models, for example) can be loaded around the circumference of the platter. A pickup bracket raises to lift a selected CD from the platter to a "playing" position. The loading drawer can be opened on user command to allow the user to load or change CDs which will be played after the current CD finishes playing (or is interrupted).

Prior art loading drawer mechanisms use a rack and pinion gear arrangement to move the drawer to the open position. A first locking mechanism keeps the drawer in the open position until the user loads the desirable disks and enters a "close" command. When the drawer is fully retracted (closed) a second locking mechanism keeps the drawer closed until another loading operation is selected by the user.

The rack and pinion drawer movement arrangements and the additional locking mechanisms associated with prior art CD carousels often add undesirable manufacturing costs and production times, as well as increase the likelihood of mechanical malfunction.

SUMMARY OF THE INVENTION

In accordance with the present invention, a disk loading and unloading apparatus for loading and unloading informational disks into a multiple disk player, comprises a loading drawer adapted to be opened for loading disks by a user, and adapted to be closed in preparation for the disk player to play loaded disks; a motorized rotational arm member; a pin member coupled to the rotational arm member and a pin member guide slot attached to the loading drawer and adapted to slidably receive the pin member. The pin member guide slot is contoured in such a manner as to provide an interplay between the pin member and the boundaries of the guide slot cause the opening and closing of the loading drawer when the rotational arm member is rotated, and the interplay between the pin member and the guide slot serve as locking means to lock the loading drawer in place at least in one predetermined drawer position.

The foregoing and further features of the invention are shown and described hereinafter with reference to the accompanying drawing.

BRIEF DESCRIPTION OF THE DRAWING

The drawing figures are briefly described as follows.

DETAILED DESCRIPTION OF THE INVENTION

Figure 1:
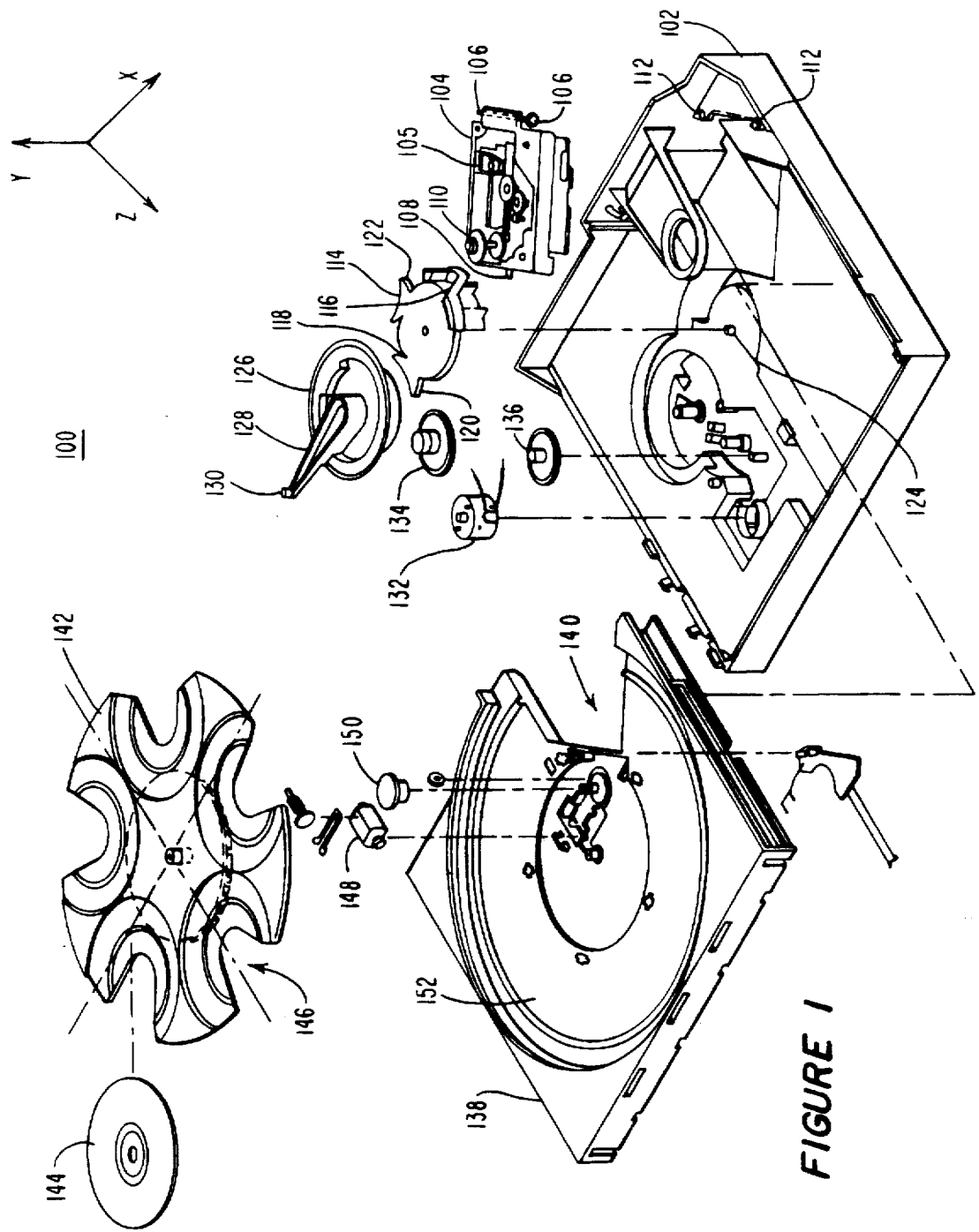
FIG. 1 is an exploded view of a portion of a CD player employing the loading drawer movement and locking mechanism of the present invention.

FIG. 1 shows a CD player 100 with a multiple disk carousel mechanism. A general description of the CD player 100, including the disk carousel mechanism of the present invention follows. A base 102 has two indentations 112 for receiving two pivot pegs 106 of a pickup bracket 104. The pickup bracket 104 contains a motorized disk mount 110 for rotating a mounted disk 144, along with a disk reader 105 for reading digitally encoded disk information signals. The pickup bracket 104 also contains a guide peg 108 which interacts with a locking index 114 to raise and lower the distal end of the pickup bracket (while pivoting at the proximal end around the pivot pegs 106) as necessary for mounting and playing a disk.

The locking index 114, which is pivotally mounted on a mount 124, has a pin member guide groove 116 for receiving the pickup bracket guide peg 108, a groove region 118, and surfaces 120 and 122. The locking index 114 is peripherally meshed (via pins and a slot) with a rotational arm assembly 126. The rotational arm assembly 126 contains a rotational pin arm 128 and a pin member 130.

A motor 132 and reduction gears 134 and 136 cooperate to rotate the rotational arm assembly 126, as will be described later.

A slidable loading drawer 138 carries (in its recessed region 152) a motorized (via motor 148 and gear 150) platter 142 capable of loading five CDs in the preferred embodiment, although alternate embodiments may hold a different number of disks. The platter 142 contains clearance areas 146 at each possible disk mounting location, as shown in FIG. 1. The loading drawer 138 also contains a large notch 140 which provides clearance for the pickup bracket 104 when it raises up to the platter to mount a disk in its playing position when a disk is to be played, or during the opening and closing of the loading drawer 138 along the z-axis shown in all of the drawing figures.

Figure 2:
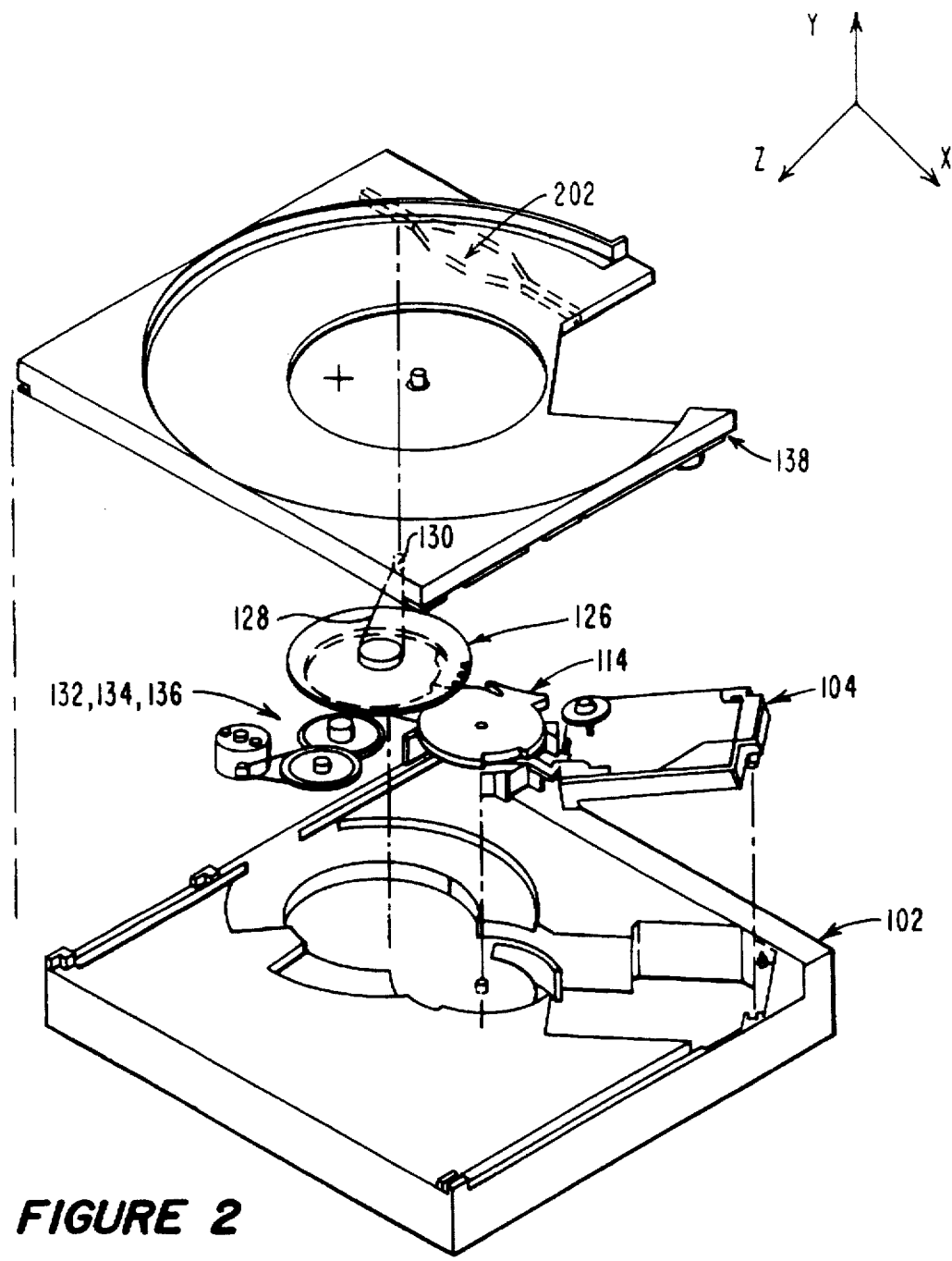
FIG. 2 is a partially exploded view of the mechanism in FIG. 1, with the disk carousel removed, showing the relative positions of the pin arm, locking index and pickup bracket components, as well as the guide slot on the bottom of the loading drawer.

The operation of the present invention will now be more fully described with reference to FIGS. 2 and 3. As can be seen from FIG. 2, the pin member 130 of the rotational pin arm 128 fits within a pin member guide slot 202 molded (or attached) to the underside of the loading drawer 138. In brief, when the motor and gears 132, 134 and 136 cause the rotational arm assembly 126 to rotate and thus displace the pin member 130, the interaction of the pin member with the boundary walls of the guide slot 202 causes the loading drawer 138 to move along the z-axis for "open," "close," and "lock" operations.

Figure 3:
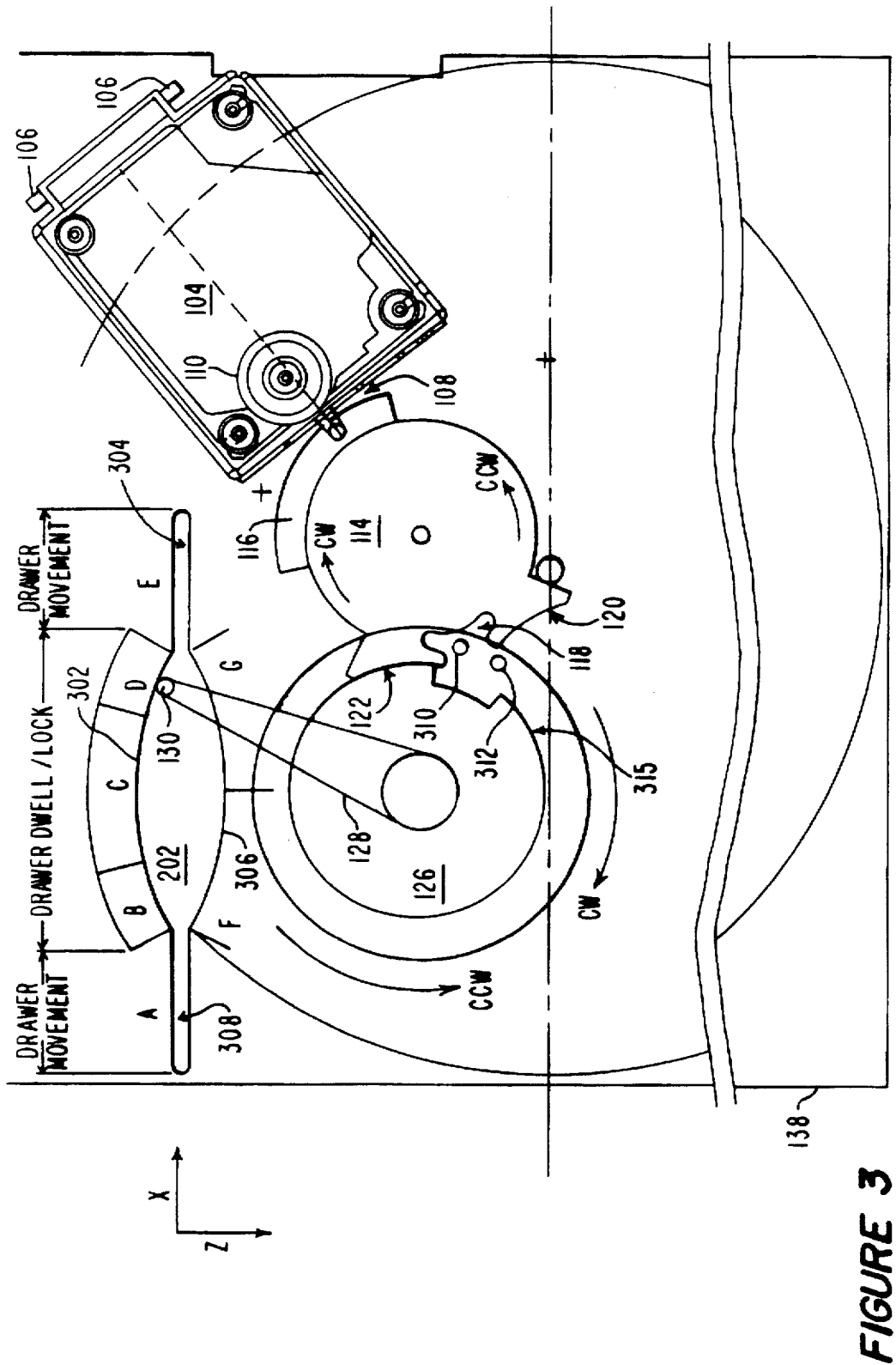
FIG. 3 is a plan view of the loading drawer and its guide slot, the pin arm, locking index, and pickup bracket.

A more detailed representation of the present-inventive guide slot 202, and the rotational arm assembly 126 is shown in the plan view of FIG. 3. Turning to that Figure, it can be seen that the guide slot 202 and the rotational arm assembly 126 cooperate in the manner of a modified Scotch yoke, such that rotation of the rotational arm assembly 126 causes the pin member 130 to impinge upon the walls of the guide slot 202 to cause translational motion of the loading drawer 138.

With the pin member 130 impinging upon the guide slot wall 302 in region D the loading drawer 138 is in a closed position. Further, while the centerline of the rotational pin arm 128 is approximately perpendicular to the curvature of the guide slot (i.e., the pin member 130 is in region D), the action of the pin member 130 on the guide slot wall in section D prevents the opening of the loading drawer 138. Thus, when the pin member 130 is at region D, the loading drawer 138 is both closed and locked.

At the location D the locking index 114 has been previously rotated counterclockwise by the action of pegs 310 and 312 (located on the rotational arm assembly 126) on the groove region 118 of the locking index. The counterclockwise rotation of the locking index 114 causes the guide groove 116 to act as a screw and lift the guide peg 108 and hence the pickup bracket 104 to the "up" position. During this motion, the pickup bracket can mount and lift a disk from the platter 142 (see FIG. 1) to a position above the platter where it may be played. The locking index is locked in the "up" position (after counterclockwise rotation) by a close fit between the surface 122 on the locking index and the surface 315 on the pin arm assembly 126. In this position, the interference between surfaces 122 and 315 prevents any further rotation (either counterclockwise or clockwise) of the locking index.

When the disk is playing, the loading drawer 138 may be opened to allow the user to access all disk positions 146 other than the one from which the currently playing disk was taken. To accomplish this operation, the rotational arm assembly 126 is rotated clockwise from region D the pin member 130 moves into region E (304) of the guide slot 202. Further clockwise rotation of the pin arm assembly 126 causes the pin member 130 to begin to pull the guide slot and hence the loading drawer 138 open until the centerline of the rotational pin arm 128 is approximately aligned with the centerline of region E 304. Further clockwise rotation causes the pin member to push the loading drawer via region E 304 until the drawer is completely open. Further clockwise rotation brings the pin member 130 to the region G along guide slot wall 306. The loading drawer 138 is fully open and in the locked position by virtue of the action of the pin member 130 on the wall 306 in region G. The pickup bracket remains in the "up" position with the disk playing.

While the loading drawer 138 is in the open and locked position (with the pin member 130 located in region G) the user can load disks to or unload disks from the platter 142. The software control of the CD player 100 makes the platter disk position from which the currently playing disk was taken, inaccessible to the user while the loading drawer is open. The remaining four disk positions 146 may be accessed through the open portion of the drawer 138 by toggling the platter 142 with partial clockwise and counterclockwise rotations. The loading drawer 138 is required to be locked in the open position during disk loading/changing operations so that the drawer cannot be inadvertently pushed closed while the empty disk well (from which the playing disk came) is not aligned with the playing disk. Otherwise, a collision of a non-playing disk and the pickup bracket could occur, leading to failure of the unit.

After disk loading and unloading are complete the user initiates a close operation. The software first aligns the open platter well with the pickup bracket 104, and the pin member 130 then rotates counterclockwise to close the loading drawer 138.

When it is desired to play a different disk, the pin member 130 is rotated counterclockwise from region D through region C to region B. While in region C the rotational arm assembly pegs 310 and 312 interact with the groove region 118 of the locking index to rotate the locking index 114 clockwise. The screw action of the guide groove 116 lowers the guide peg 108 and hence the distal end of the pickup bracket 104. During this downward motion of the pickup bracket 104 the playing disk is lowered into an empty platter well below the disk. With the pin member 130 in region B, the pickup bracket 104 is below the platter 142, allowing clearance for the platter to rotate. The platter then rotates to align another disk position of the user's choice with the pickup bracket. When the new disk position is aligned with the pickup bracket, the rotational pin arm 128 rotates the pin member 130 from region B to region C, causing the pickup bracket to lift the disk from the platter 142. The pin member 130 continues to rotate clockwise until it stops in region D. At this point, the pickup bracket 104 is substantially horizontal with the new disk above the platter in the "play" position. While the pin member 130 is in regions B, C and D along wall 302 of the guide slot 292, the loading drawer 138 is both closed and locked.

If the user desires to stop playing a disk, the pin member 130 rotates counterclockwise from region D through region C to rest in region B. If no further operations are initiated, the loading drawer 138 remains in a closed and locked position, and no disk is currently playing.

To load or change disks while no disk is currently playing, the pin member 130 rotates counterclockwise from region B or C (depending upon its location at the time of the "open" operation is initiated), into region A (308), and finally to region F along the wall 306. The aforementioned action of the pin member 130 causes the loading drawer 138 to open and lock in the open position. The user can then change disks or load additional disks by accessing any of the five positions. After changing or adding disks a loading drawer closing operation can be carried out (initiated by the user) by a clockwise rotation of the pin member 130 from region F to region A, and finally to region B.

A novel CD carousel mechanism has been described above with unique loading drawer movement and loading drawer locking characteristics. Various acceptable software control details to implement a CD player which includes the present invention, are easily constructed by those skilled in the art.

Variations and modifications to the above embodiment are possible. However, all such variations and modifications are intended to be within the scope of the invention claimed by this letters patent.

For example, the present invention is not limited to use with CDs of the audio and/or video variety, and is capable of adaptation to information disks in general. Also, the present invention is not limited to use with CD players, but is also operational with general disk readers employing multiple disk carousels.

I claim:

1. A disk loading and unloading apparatus for loading and unloading informational disks into a multiple disk player, said apparatus comprising:

a loading drawer adapted to be opened for loading disks by a user, and adapted to be closed in preparation for said disk player to play loaded disks;

a motorized rotational arm member;

a pin member coupled to said rotational arm member; and a pin member guide slot attached to said loading drawer which slidably receives said pin member;

wherein said pin member guide slot has a contour which provides an interplay between said pin member and the boundaries of said guide slot, facilitating opening and closing of said loading drawer when said rotational arm member is rotated, said contour comprising two end regions, one on each side of a curved middle region, said end regions providing drawer movement between open and closed positions and vice versa, said middle region providing drawer dwell and locking states for locking said drawer in a predetermined open loading drawer position and in a predetermined closed drawer position;

a pivotally mounted pickup bracket for raising and lowering a disk mounted thereon; and a rotatable locking index coupled to a non-pivoting end of said pickup bracket, and operatively coupled to said rotational arm member;

wherein rotation of said locking index in a first direction causes said non-pivoting end of said pickup bracket to be raised, and rotation of said locking index in a second direction causes said non-pivoting end of said pickup bracket to be lowered.

2. The apparatus in claim 1 wherein the centerline of said pin member guide slot is substantially perpendicular to the axis of movement of said loading drawer.

3. The apparatus in claim 1 wherein said locking index comprises an off-axis guide groove attached to its periphery, and the non-pivoting end of said pickup bracket comprises a guide pin adapted to be inserted into said guide groove, wherein the interplay between said guide groove and said guide pin raises and lowers the non-pivoting end of said pickup bracket with the rotation of said locking index.

4. The apparatus in claim 3 further comprising at least one locking index rotation limiter for limiting the amount of rotation of said locking index in at least one direction.

5. The apparatus of claim 4 wherein said rotation limiter limits the amount of rotation of said locking index in both directions.

* * * * *